United States Patent [19]

Matsubara et al.

[11] Patent Number: 4,813,519
[45] Date of Patent: Mar. 21, 1989

[54] CYLINDER PISTON APPARATUS FOR A SUSPENSION SYSTEM

[75] Inventors: Kousuke Matsubara; Takeo Fukumura, both of Yokohama, Japan

[73] Assignee: NHK Spring Co., Ltd., Tokyo, Japan

[21] Appl. No.: 62,766

[22] Filed: Jun. 15, 1987

[30] Foreign Application Priority Data

Jun. 23, 1986 [JP] Japan ................................ 61-146484
Mar. 16, 1987 [JP] Japan ................................ 62-60402

[51] Int. Cl.⁴ ...................... B60G 17/00; B60G 11/26
[52] U.S. Cl. .................... 188/299; 188/282; 188/285; 188/322.15; 267/64.15
[58] Field of Search ............... 188/299, 280, 285, 279, 188/282, 314, 319, 322.15; 267/217, 218, 64.13, 64.15, 64.16

[56] References Cited

U.S. PATENT DOCUMENTS

| | | | |
|---|---|---|---|
| 3,399,905 | 9/1968 | Vogel | 267/218 X |
| 3,559,776 | 2/1971 | Schultze | 188/299 |
| 3,627,348 | 12/1971 | Klees | 280/124 |
| 4,061,295 | 12/1977 | Somm | 188/299 X |
| 4,334,600 | 6/1982 | Palitto | 188/314 |
| 4,491,207 | 11/1985 | Boonchanta et al. | 188/299 |
| 4,527,676 | 7/1985 | Emura et al. | 188/299 |
| 4,555,126 | 11/1985 | Ishimitsu et al. | 280/707 |
| 4,620,619 | 11/1986 | Emura et al. | 188/319 |

FOREIGN PATENT DOCUMENTS

| | | | |
|---|---|---|---|
| 3405315 | 8/1985 | Fed. Rep. of Germany | 188/299 |
| 48-9486 | 3/1973 | Japan . | |
| 55-65741 | 5/1980 | Japan . | |
| 1311646 | 3/1973 | United Kingdom . | |
| 2135020 | 8/1984 | United Kingdom . | |
| 2158184 | 11/1985 | United Kingdom | 188/299 |

Primary Examiner—Matthew C. Graham
Assistant Examiner—Andres Kashnikow
Attorney, Agent, or Firm—Frishauf, Holtz, Goodman & Woodward

[57] ABSTRACT

A cylinder piston apparatus according to the present invention comprises a cylinder housing having an oil chamber therein, and a rod fitted in the cylinder housing. A piston-shaped partition member is arranged in the cylinder assembly. The oil chamber is divided into first and second oil chambers by the partition member. The partition member is provided with a valve housing, which has an outside circulation hole capable of communicating with the second oil chamber. A rotary valve is fitted in the valve housing. The valve has an inside circulation hole, which is situated at a position corresponding to the outside circulation hole, and can communicate with the first oil chamber. A stepping motor for driving the rotary valve is housed in a motor-holding chamber which is defined inside the cylinder assembly. The motor-holding chamber is filled with oil, so that the motor is immersed in the oil.

13 Claims, 8 Drawing Sheets

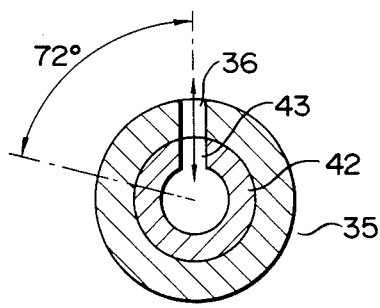
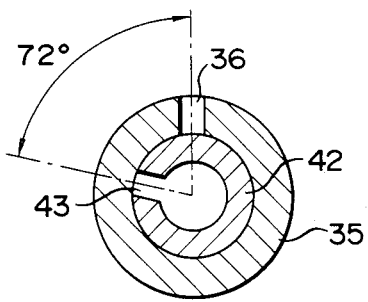
F I G. 7A     F I G. 7B
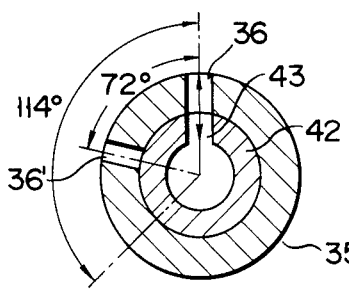
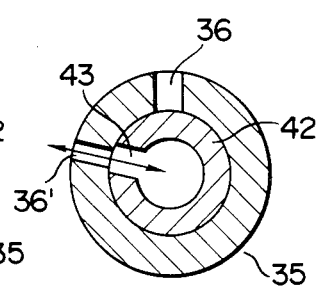
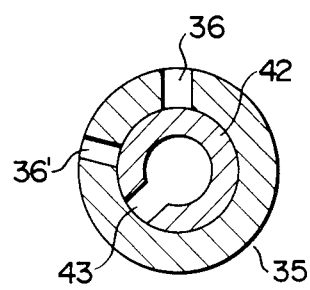
F I G. 8A     F I G. 8B     F I G. 8C
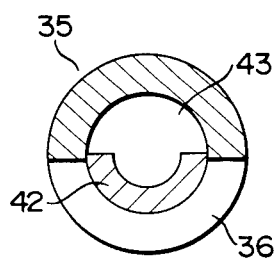
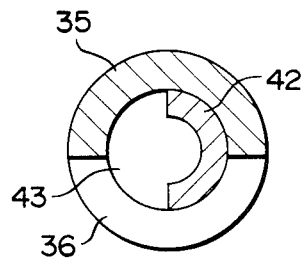
F I G. 9A     F I G. 9B

CYLINDER PISTON APPARATUS FOR A SUSPENSION SYSTEM

BACKGROUND OF THE INVENTION

The present invention relates to a cylinder piston apparatus used in a car suspension system, and more specifically, to the improvement of a cylinder piston apparatus having an oil chamber and a damping-force generating mechanism therein.

Prior art cylinder piston apparatuses for suspension systems, which are adapted to contain oil and gas, comprise a cylinder housing and a rod fitted therein. An oil chamber and a gas chamber are defined inside the cylinder housing, as well as a damping-force generating mechanism having an orifice. The reciprocation of the rod, relative to the cylinder housing, is damped by viscous resistance which is produced as the oil passes through the orifice.

Cylinder piston apparatuses of this type have conventionally been proposed whose damping force can be varied. Examples of these apparatuses include shock absorbers which are disclosed in U.S. Pat. Nos. 4,527,676 and 4,620,619. In these apparatuses, a rotary valve is fitted in a valve housing which is attached to the damping-force generating mechanism. The rotary valve is driven by a motor. The valve housing has a plurality of first circulation holes of different sizes, while the rotary valve has a plurality of second circulation holes. When the rotary valve is rotated to a predetermined position, the first and second circulation holes communicate with one another, so that a damping force can be produced, which corresponds to the size of the circulation holes.

The motor is located in a motor-holding chamber which is defined inside the rod. Conventionally, the holding chamber is isolated from the oil chamber by means of a seal member, such as an O-ring, in order to keep the motor from coming into contact with the oil. To prevent the oil in the oil chamber from flowing into the motor-holding chamber, therefore, the output shaft of the motor is also sealed by means of a seal member.

In the prior art apparatuses constructed in this manner, the rotation of the motor shaft is impeded by friction generated between the shaft and the seal member. When the oil flows through the damping-force generating mechanism, moreover, a differential pressure is produced between the inside and outside of the rotary valve. Accordingly, if the motor used is a low-torque motor, such as a stepping motor, the rotary valve sometimes cannot rotate smoothly, and is thus unable to change the damping force accurately.

SUMMARY OF THE INVENTION

Accordingly, the object of the present invention is to provide a cylinder piston apparatus in which a rotary valve can be rotated accurately, so as to ensure that the damping force can be changed accurately.

In order to achieve the above object of the present invention, a cylinder piston apparatus for a suspension system is provided, which comprises a cylinder assembly including a cylinder housing and a rod fitted therein for movement in the axial direction thereof, the cylinder assembly having an oil chamber therein; partition means attached to the rod in the cylinder assembly, whereby the oil chamber in the cylinder assembly is divided into first and second oil chambers; a valve housing attached to the partition means and including first oil-circulation means capable of communicating with the second oil chamber; a rotary valve rotatably fitted in the valve housing and including second oil-circulation means capable of communicating with the first oil chamber, the second oil-circulation means being situated in a position corresponding to the first oil-circulation means; and a stepping motor located in the cylinder assembly and having an output shaft, so that the rotary valve is driven thereby, the stepping motor being mounted in a motor-holding chamber defined inside the cylinder assembly, the motor-holding chamber being filled with the oil in the oil chamber so that the motor is immersed in the oil.

In the cylinder piston apparatus constructed in this manner, the rotary valve is driven by the output shaft of the stepping motor. When the rotary valve is rotated to a predetermined position, the first oil-circulation means of the valve housing communicates with the second oil-circulation means of the rotary valve. When the rod moves axially with respect to the cylinder housing, the oil flows through the two oil-circulation means, so that a damping force corresponding to the cross-sectional flow area is produced.

Since the stepping motor is immersed in the oil in the oil chamber, with the result that the oil penetrates the motor, no sealing means is required between the motor-holding chamber and the oil chamber. Therefore, the output shaft of the motor need not be sealed by means of any seal member, either. In addition, the output shaft is lubricated by the oil, and therefore, the frictional resistance produced during the rotation of the output shaft is lower than in the case of the prior art apparatuses. Being immersed in the oil, moreover, the motor can enjoy a much higher cooling efficiency.

BRIEF DESCRIPTION OF THE DRAWINGS

FIGS. 7A and 7B are cross-sectional views of the damping-force generating mechanism, illustrating different operating states;

FIGS. 8A, 8B, and 8C are sectional views of a modification of the damping-force generating mechanism, illustrating different operating states;

FIG. 9A and 9B are sectional views of another modification of the damping-force generating mechanism, illustrating different operating states;

DETAILED DESCRIPTION OF THE PREFERRED EMBODIMENTS

Figure 1:
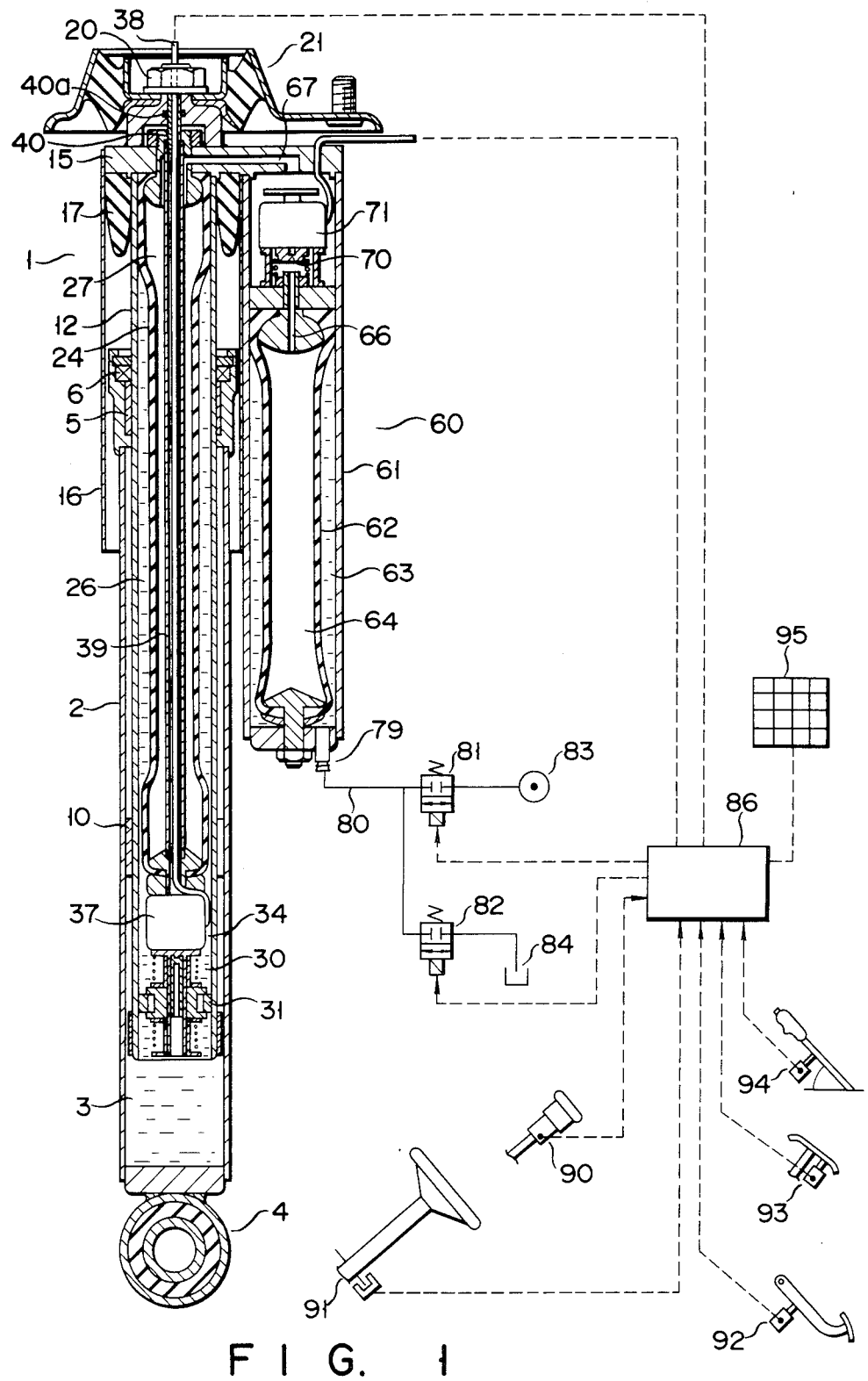
FIG. 1 is a longitudinal sectional view of a suspension system according to a first embodiment of the present invention.

FIGS. 1 to 7 show a cylinder piston apparatus for a car suspension according to a first embodiment of the present invention. Cylinder assembly 1 used in the cylinder piston apparatus includes cylinder housing 2. First oil chamber 3 is defined inside housing 2. The bottom end of cylinder housing 2 is connected to a wheel-side member by means of coupling member 4. Bearing 5 and seal 6 are provided at the upper portion of cylinder housing 2, while bearing 10 is attached to the middle portion thereof.

Hollow rod 12 is slidably fitted in cylinder housing 2. Cover 16 and rubber bumper 17 are attached to bracket 15, which is mounted on the upper end of rod 12. Mount insulator 21 is fixed to the upper surface of bracket 15 by means of nut 20.

Hollow rod 12 contains cylindrical flexible bladder 24 which divides second oil chamber 26 from gas chamber 27. A compressed inert gas, e.g., nitrogen, is sealed in chamber 27.

Figure 2:
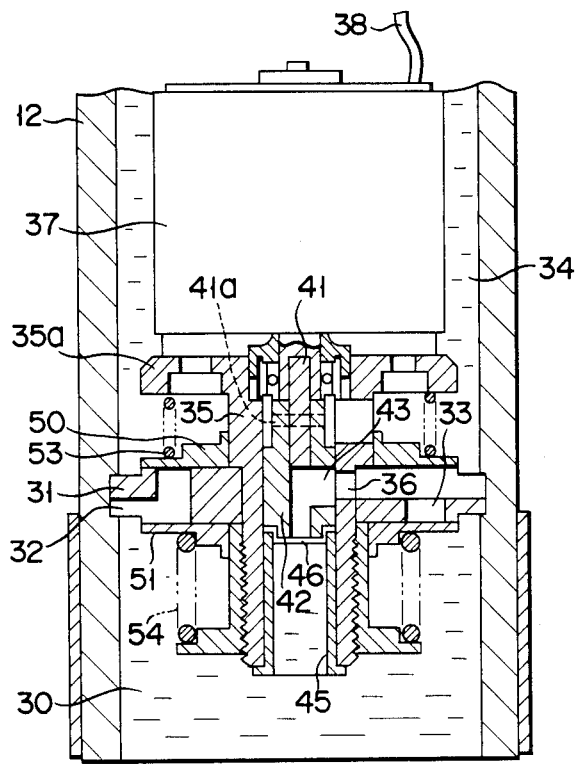
FIG. 2 is an enlarged sectional view of a damping-generating mechanism shown in FIG. 1.
Figure 3:
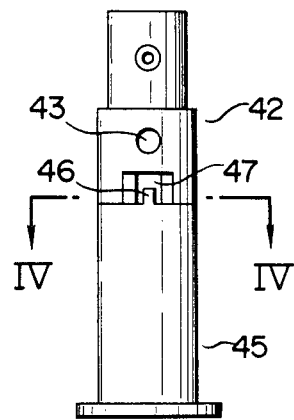
FIG. 3 is a front view of stopper means shown in FIG. 1.
Figure 4:
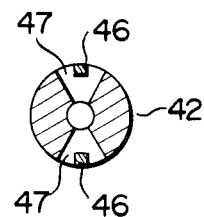
FIG. 4 is a sectional view taken along line IV—IV of FIG. 3.
Figure 5:
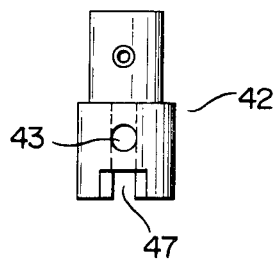
FIG. 5 is a front view of a rotary valve shown in FIG. 1.

Damping-force generating mechanism 30 is attached to rod 12. As is shown in FIG. 2, disk-shaped partition member 31, for use as a partition, is fixed to rod 12. Partition member 31 has orifices 32 and 33. Valve housing 35 is fixed to the central portion of member 31. As is shown in FIG. 7, valve housing 35 has outside circulation hole 36 which serves as first oil-circulation means.

Defined above valve housing 35 is motor-holding chamber 34 which is filled with oil. Stepping motor 37 is housed in chamber 34, being fixed to flange 35a of valve housing 35. Lead wire 38 of motor 37 is passed through pipe 39, and is drawn out of rod 12. In this embodiment, the stepping motor rotates through 18° with every pulse. A gap is left between lead wire 38 and the periphery of the hole cut in bracket 15 of the rod 12. This gap is filled with connector 40 made of a synthetic resin, and O-ring 40a is mounted on connector 40, thereby to prevent the oil from leaking from pipe 39.

Rotary valve 42, which is fitted in valve housing 35, is fixed to output shaft 41 of motor 37 by means of pin 41a. Valve 42 has inside circulation hole 43 for use as second oil-circulation means.

Figure 6:
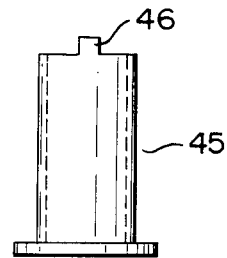
FIG. 6 is a front view of a stopper shown in FIG. 1.

The initial position of rotary valve 42 is restricted by cylindrical stopper 45 (FIG. 6). Stopper 45 has projection 46 on its upper end. Projection 46 is fitted in recess 47 in the end face of valve 42. Projection 46 and recess 47 constitute stopper means. Plates 50 and 51 are arranged on the upper and lower surfaces of partition member 31, respectively, so as to be pressed against member 31 by means of springs 53 and 54, respectively.

As is shown in FIG. 1, sub-tank 60 includes outer cylinder 61, with cylindrical bladder 62 therein. Bladder 62 divides oil chamber 63 and gas chamber 64. Gas chamber 64 communicates with gas chamber 27 of hollow rod 12 by means of passages 66 and 67. Located between passages 66 and 67 is valve 70 which is operated by means of solenoid 71. When valve 70 is opened, gas chambers 27 and 64 cooperate as a gas spring, so that the spring constant lowers. When valve 70 is closed, only chamber 27 serves as a gas spring, so that the spring constant increases.

Oil pipe 80 is connected to oil port 79 of oil chamber 63. Pipe 80 is also connected to hydraulic pump 83 and oil tank 84 via solenoid valves 81 and 82, respectively. Valves 81 and 82 are controlled by signals delivered from controller 86. Controller 86 is supplied with signals from speed sensor 90, steering-angle sensor 91, braking sensor 92, acceleration sensor 93, hand-braking sensor 94, control switch 95, etc.

In the cylinder piston apparatus constructed in this manner, if rod 12 is pushed into cylinder housing 2, plate 50 rises, so that orifice 32 opens. As a result, some of the oil in first oil chamber 3 flows into second oil chamber 26 via orifice 32. In accordance with the depth of depression of rod 12, the capacity of gas chamber 27 is reduced, so that the repulsive force of the gas increases correspondingly.

If rod 12 moves in its extending direction, on the other hand, plate 51 descends, so that orifice 33 opens. As a result, some of the oil in oil chamber 26 flows into oil chamber 3 via orifice 33. In this case, the capacity of gas chamber 27 increases.

When rotary valve 42 is situated in the position shown in FIG. 7A, circulation holes 36 and 43 communicate with each other, so that the oil can flow through holes 36 and 43. When valve 42 is rotated to the position shown in FIG. 7B, hole 36 is closed, so that the oil ceases flowing through holes 36 and 43. Since the oil flows only through orifice 32 or 33 in such a case, the resulting damping force is high. In this embodiment, stepping motor 37 rotates through 18° with every pulse. Accordingly, the damping force is changed with every four pulses (corresponding to 72°). The period of time required for such a change is 6.6 msec, for example.

When stepping motor 37 is switched on, it continues to generate pulses until projection 46 of stopper 45 abuts against the side wall of recess 47. This enables rotary valve 42 to be rotated to its initial position as a reference position for rotation. Motor 37 can be used for open-loop control of the position of valve 42, based on the initial position.

Stepping motor 37 and solenoid 71 are controlled by controller 86. When a vehicle turns or circles around, valve 70 is closed by the signals from sensors 90 and 91, so that the spring constant increases. At the same time, rotary valve 42 is rotated to the position shown in FIG. 7B, so that the damping force increases. In this way, therefore, the vehicle body can be restrained from rolling.

If valve 70 is opened to connect gas chambers 27 and 64, and if rotary valve 42 is rotated to the position of FIG. 7A, the spring constant lowers, and the damping force is reduced. As a result, the vehicle's level of ride comfort is improved.

If valve 81, which is connected to oil pipe 80, is opened to allow oil chamber 63 to be replenished with oil, rod 12 projects further, so that the car height can be increased. If valves 81 and 82 are closed and opened, respectively, to discharge the oil from chamber 63, the car height is reduced.

In a modification shown in FIG. 8, circulation hole 36 is provided in combination with circulation hole 36' of a smaller size. The damping force is at a minimum in the state shown in FIG. 8A; medium in FIG. 8B, and at a maximum in FIG. 8C. In a modification shown in FIGS. 9A and 9B, the cross-sectional flow area can be changed little by little, by rotating rotary valve 42 over a range of 180° from the position of FIG. 9A.

Figure 10:
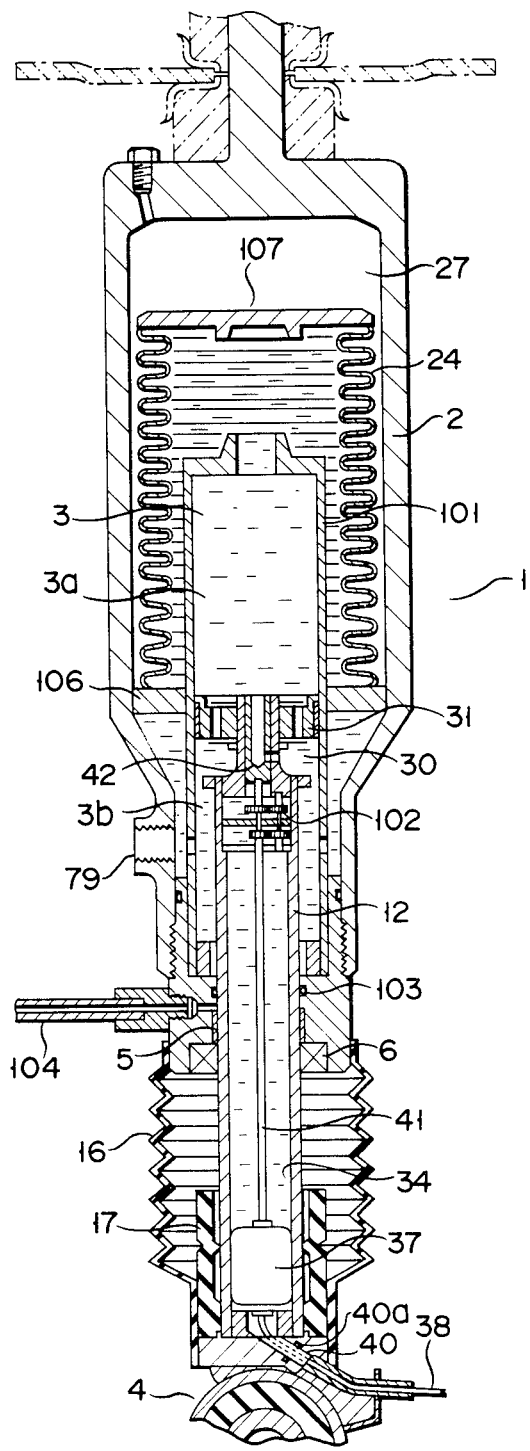
FIG. 10 is a longitudinal sectional view of a suspension system according to a second embodiment of the invention.
Figure 11:
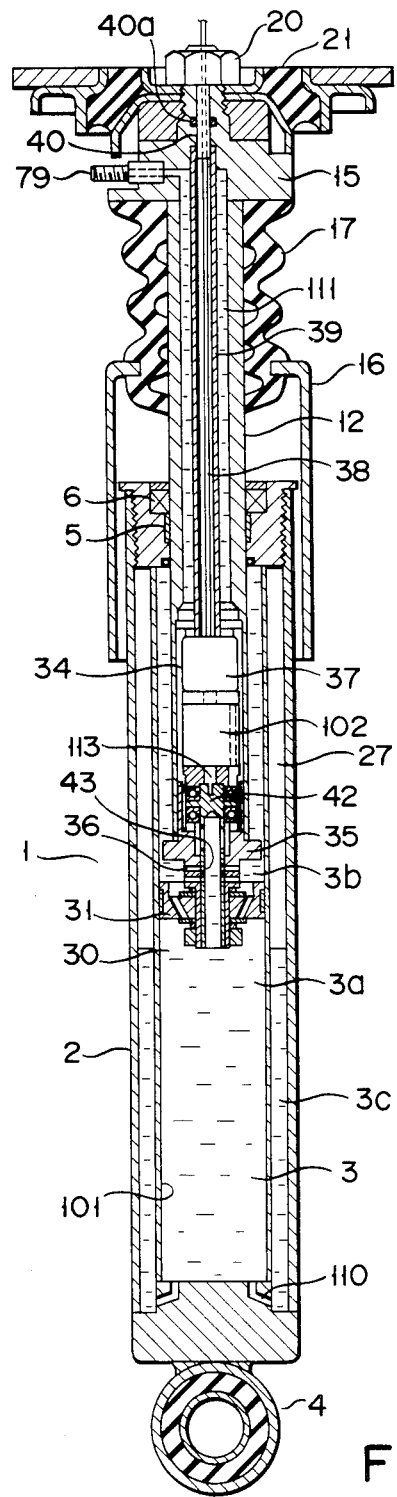
FIG. 11 is a longitudinal sectional view of a cylinder piston apparatus according to a third embodiment of the invention.

FIG. 10 shows a second embodiment of the present invention. Inner cylinder 101 is fixed inside cylinder housing 2. The inside of cylinder 101 is divided into first and second oil chambers 3a and 3b, by piston-shaped partition member 31. Member 31 is movable in the axial direction of cylinder 101. Speed reducer 102 is arranged between output shaft 41 of stepping motor 37 and rotary valve 42. Reducer 102 is housed in a reducer-holding chamber which is filled with oil. The torque of motor 37 is enhanced by reducer 102. Drain port 104 is connected between bearing 5 and seal 103. Bellows-shaped bladder 24 is located inside cylinder housing 2. The lower end of bladder 24 is fixed to plate 106. Lid 107 is provided on the upper end of bladder 24. Bladder 24 divides oil chamber 3 and gas chamber 27.

FIGS. 11 to 14 show a third embodiment of the present invention. Oil chamber 3c and gas chamber 27 are defined between cylinder housing 2 and inner cylinder 101. Chamber 3c communicates with oil chamber 3 by means of hole 110. Oil passage 111 is defined between the inner surface of hollow rod 12 and outer surface of pipe 39. Damping-force generating mechanism 30 is provided with piston-shaped partition member 31. Member 31 divides oil chamber 3 into first and second oil chambers 3a and 3b.

Figure 12:
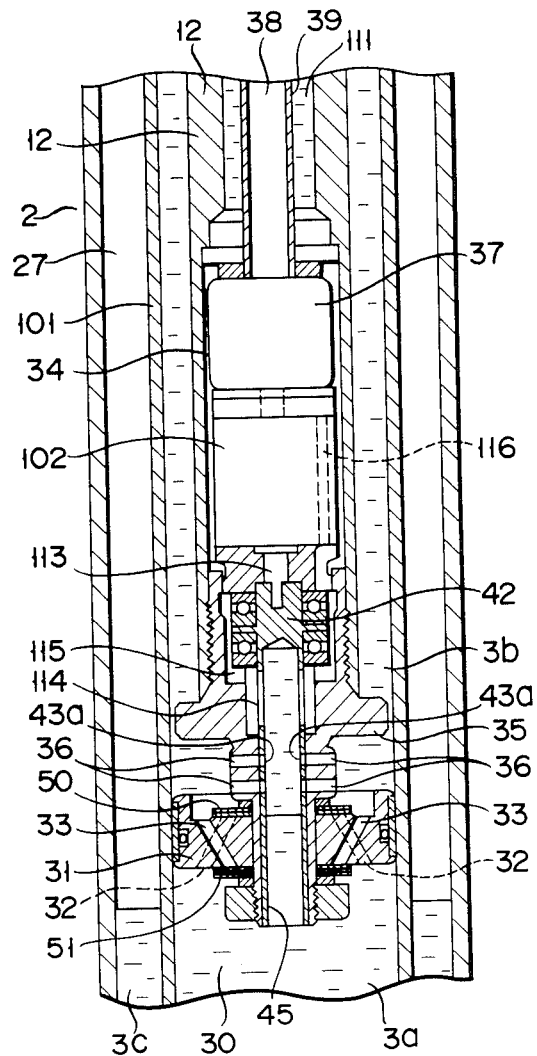
FIG. 12 is a partial enlarged sectional view of the suspension system shown in FIG. 11.

Rotary valve 42 is fitted in valve housing 35, which is fixed to partition member 31. Stepping motor 37 is housed in motor-holding chamber 34 inside rod 12. Chamber 34 is filled with oil, so that motor 37 is immersed therein. Output shaft 113 of speed reducer 102 is coupled to rotary valve 42. As is shown in FIG. 12, hole 114 of valve 42 communicates with oil passage 111 of rod 12 by means of oil passages 115 and 116.

Figure 13:
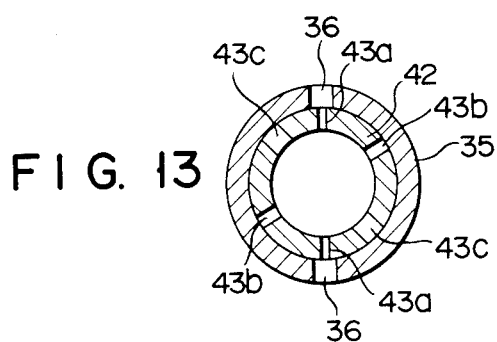
FIGS. 13 and 14 are cross-sectional views of a damping-force generating mechanism shown in FIG. 11, illustration different operating states.
Figure 14:
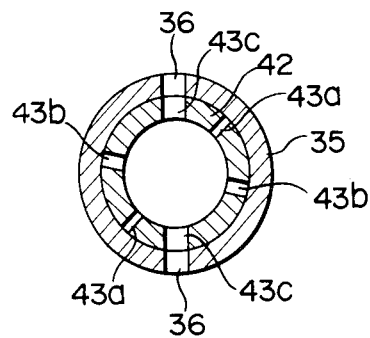

As is shown in FIG. 13, valve housing 35 has a pair of outside circulation holes 36, which communicate with second oil chamber 3b. Holes 36 are situated diametrically opposite to one another, with respect to the circumferential direction of housing 35.

Rotary valve 42 has a plurality of inside circulation holes 43a, 43b, and 43c, of three different sizes, which are situated corresponding to outside circulation holes 36. When smallest inside holes 43a communicate with outside holes 36, as shown in FIG. 13, a strong damping force can be obtained. If valve 42 is rotated, by means of stepping motor 37, to the position shown in FIG. 14, largest inside holes 43c communicate with outside holes 36, so that the damping force becomes minimum. When medium-sized inside holes 43b communicate with holes 36, the resulting damping force is medium.

The greater the damping force, the larger the differential pressure will be between first and second oil chambers 3a and 3b. Since outside circulation holes 36 are situated diametrically opposite to one another, with respect to the circumferential direction of valve housing 35, a uniform pressure is applied to rotary valve 42 through holes 36. Inside circulation holes 43a, 43b, and 43c are also situated at regular intervals, with respect to the circumferential direction of valve 42, so that the pressure applied to valve housing 35 through holes 43a, 43b, and 43c is also uniform. Therefore, valve 42 can rotate smoothly.

Stepping motor 37, which must be housed in narrow rod 12, is of small size. Consequently, the torque of motor 37 is less than that of a conventional DC motor. With the use of speed reducer 102, however, the torque of output shaft 113 can be increased.

Figure 15:
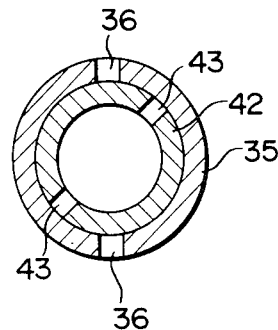
FIGS. 15 and 16 are sectional views showing modifications of the damping-force generating mechanism.
Figure 16:
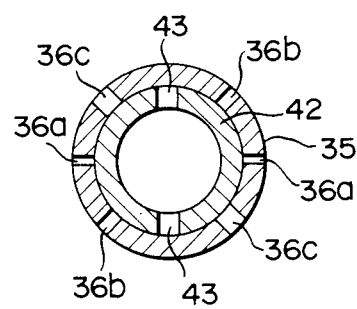

Outside circulation holes 36 may be three or more in number. As is shown in FIG. 15, moreover, inside circulation holes 43 may be two in number. As is shown in FIG. 16, furthermore, valve housing 35 may be provided with a plurality of outside circulation holes 36a, 36b, and 36c of three different sizes.

Figure 17:
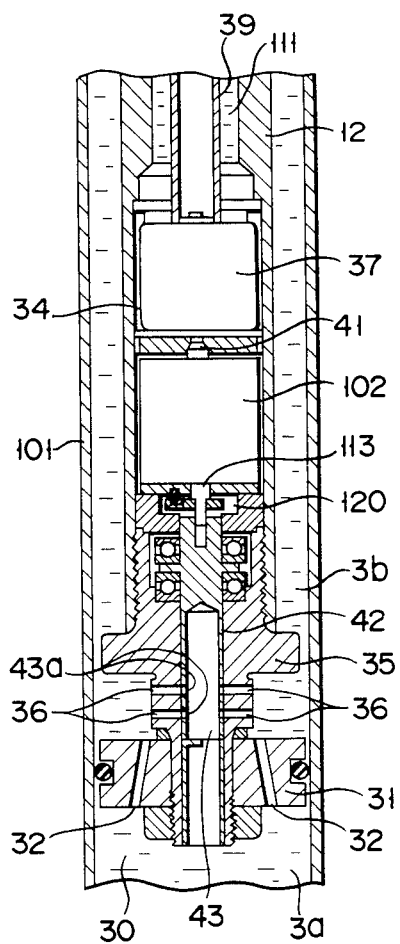
FIG. 17 is a longitudinal sectional view showing another modification of the damping-force generating mechanism.
Figure 18:
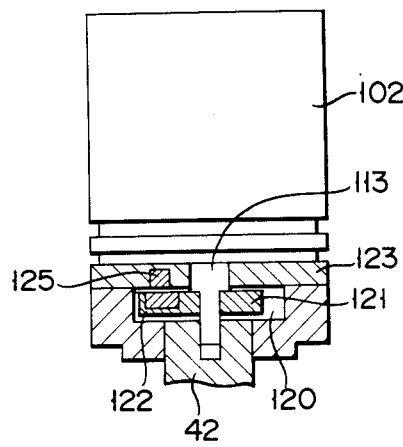
FIG. 18 is an enlarged sectional view of a rotary encodeer shown in FIG. 17.
Figure 19:
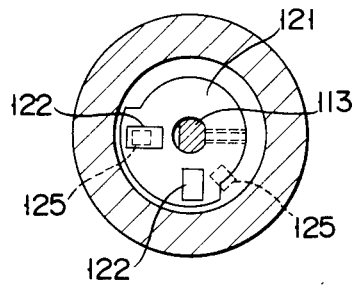
FIG. 19 is a cross-sectional view of the rotary encoder shown in FIG. 18.

In a modification shown in FIGS. 17 to 19, damping-force generating mechanism 30 is provided with encoder 120 for detecting the position of rotary valve 42. In this case, rotating plate 121 is mounted on output shaft 113 of speed reducer 102, and permanent magnet 122 is attached to plate 121. Hall element 125 is located at each end of an angular range through which valve 42 rotates. When stepping motor 37 is switched on, it is rotated to a position such that magnet 122 faces either of paired elements 125. Based on this position as a reference position, rotary valve 42 is subjected to open-loop position control by motor 37.

Figure 20:
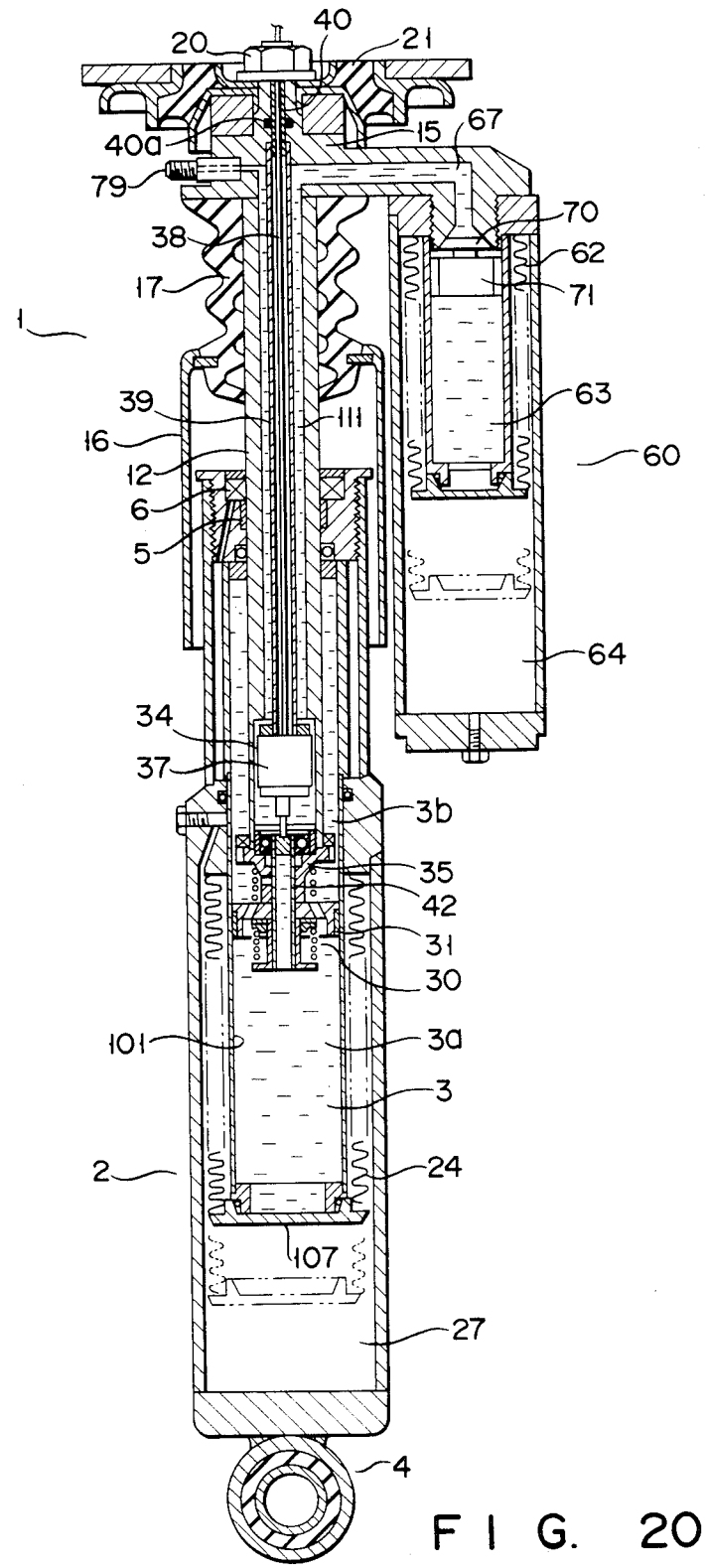
FIG. 20 is a longitudinal sectional view of a suspension system according to a fourth embodiment of the invention.

FIG. 20 shows a fourth embodiment of the present invention. A cylinder piston apparatus of this embodiment includes sub-tank 60. Cylinder housing 2 contains bellows-shaped bladder 24, which divides oil chamber 3 and gas chamber 27. Bladder 24 is designed so as to able to extend or contract, depending on the capacity of gas chamber 27. Oil chamber 63 and gas chamber 64 are also defined inside sub-tank 60. Chambers 63 and 64 are divided by bellows-shaped bladder 62. Oil chamber 63 of sub-tank 60 and oil passage 111 of rod 12 communicate with each other by means of passage 67. Arranged in the middle of passage 67 is valve 70 which is driven by solenoid 71.

When valve 70 is opened, oil chambers 3 and 63 communicate with each other. In this case, two gas chambers 27 and 64 cooperate as a gas spring, so that the spring constant lowers. When valve 70 is closed, only chamber 27 serves as a gas spring, so that the spring constant increases.

What is claimed is:
1. A cylinder piston apparatus for a suspension system, comprising:
 a cylinder assembly including a cylinder housing and a hollow rod fitted therein for movement in the axial direction thereof, said cylinder assembly having an oil chamber, and a gas chamber in which a compressed gas is sealed therein, said rod having an axially-extending oil passage defined therein;
 partition means attached to the rod in the cylinder assembly, whereby the oil chamber in the cylinder assembly is divided into first and second oil chambers;
 a valve housing attached to the partition means and including first oil-circulation means capable of communicating with the second oil chamber;
 a rotary valve rotatably fitted in the valve housing and including second oil-circulation means capable of communicating with the first oil chamber, said second oil-circulation means being situated in a position corresponding to the first oil-circulation means; and a rotary stepping motor located in the hollow rod and having a lead wire and an output shaft, so that the rotary valve is driven by the output shaft; wherein said stepping motor is mounted in the motor-holding chamber defined inside the hollow rod, said motor-holding chamber being in communication with both the oil passage and the oil chamber, and said motor-holding chamber, said oil passage, and said oil chamber being filled with oil, so that the motor is immersed in the oil.

2. The cylinder piston apparatus according to claim 1, further comprising a speed reducer located between the output shaft of the stepping motor and the rotary valve.

3. The cylinder piston apparatus according to claim 2, wherein said speed reducer is arranged in a reducer-holding chamber defined inside the cylinder assembly, said reducer-holding chamber being filled with the oil in the oil chamber, so that the speed reducer is immersed in the oil.

4. The cylinder piston apparatus according to claim 1, wherein said first oil-circulation means of the valve housing includes an outside circulation hole, and said second oil-circulation means of the rotary valve includes an inside circulation hole adapted to communicate with the outside circulation hole when the rotary valve is rotated to a predetermined position.

5. The cylinder piston apparatus according to claim 1, wherein said first oil-circulation means of the valve housing includes a plurality of outside circulation holes of different sizes, and said second oil-circulation means of the rotary valve includes at least one inside circulation hole adapted to communicate with the outside circulation holes when the rotary valve is rotated to a predetermined position.

6. The cylinder piston apparatus according to claim 1, wherein said second oil-circulation means of the rotary valve includes a plurality of inside circulation holes of different sizes, and said first oil-circulation means of the valve housing includes at least one outside circulation hole adapted to communicate with the inside circulation holes when the rotary valve is rotated to a predetermined position.

7. The cylinder piston apparatus according to claim 1, wherein said first oil-circulation means includes a plurality of outside circulation holes situated at regular intervals, with respect to the circumferential direction of the valve housing.

8. The cylinder piston apparatus according to claim 1, wherein said second oil-circulation means includes a plurality of inside circulation holes situated at regular intervals, with respect to the circumferential dieection of the rotary valve.

9. The cylinder piston apparatus according to claim 1, wherein said rotary valve is provided with stopper means for restricting the initial position of the rotary valve relative to the valve housing.

10. The cylinder piston apparatus according to claim 1, further comprising a rotary encoder for detecting the reference position of the rotary valve relative to the valve housing.

11. The cylinder piston apparatus according to claim 1, further comprising an oil pipe connected to the cylinder assembly, so as to communicate with the oil chamber in the cylinder assembly, and a hydraulic pump connected to the oil pipe via a switch valve.

12. The cylinder piston apparatus according to claim 1, further comprising a sub-tank independent of the cylinder assembly, said sub-tank having therein an oil tank and a gas chamber, divided from each other, said oil chamber being capable of communicating with the oil chamber of the cylinder assembly.

13. The cylinder piston apparatus according to claim 1, wherein said rod has a through hole for guiding said lead wire, and a gap between said lead wire and the periphery of said through hole is filled with a seal means.

* * * * *

UNITED STATES PATENT AND TRADEMARK OFFICE
CERTIFICATE OF CORRECTION

PATENT NO. : 4,813,519

DATED : March 21, 1989

INVENTOR(S) : MATSUBARA et al

It is certified that error appears in the above-identified patent and that said Letters Patent is hereby corrected as shown below:

In the title page of the patent, change assignee's address from "Tokyo, Japan" to -- Yokohama, Japan --.

Signed and Sealed this

Third Day of April, 1990

*Attest:*

HARRY F. MANBECK, JR.

*Attesting Officer*  *Commissioner of Patents and Trademarks*